Feb. 28, 1950  H. P. WILLIAMS  2,498,730
THERMIONIC AMPLIFIER CIRCUIT
Filed July 7, 1945
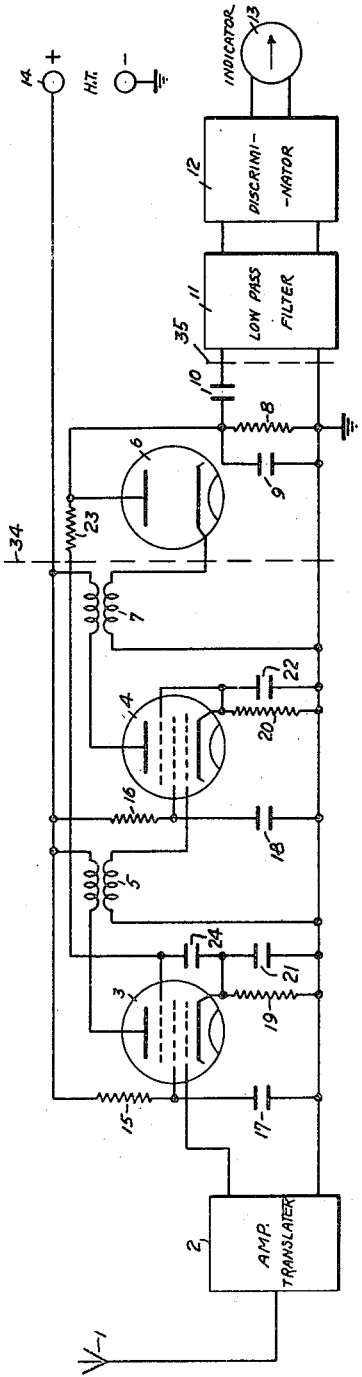
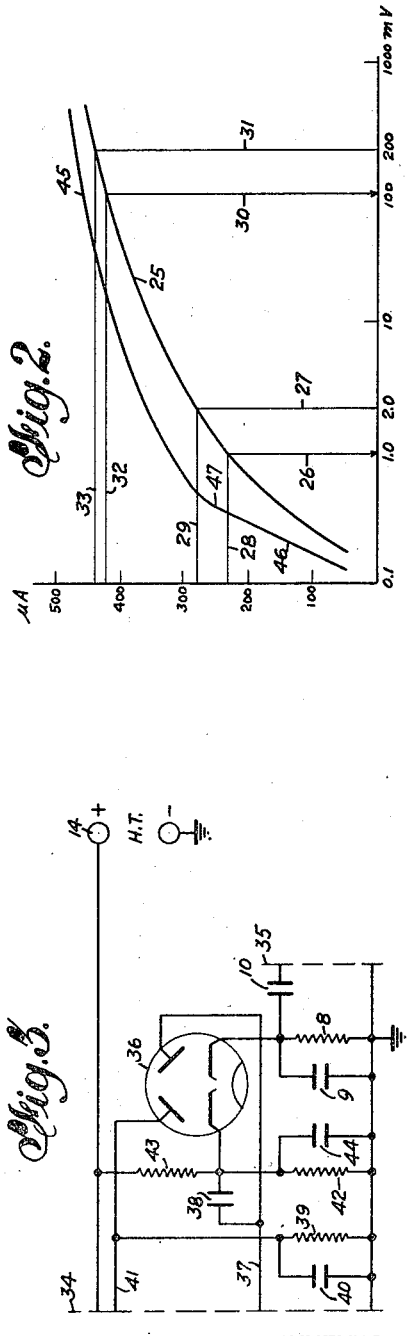
INVENTOR
HERBERT P. WILLIAMS
BY
ATTORNEY Patented Feb. 28, 1950

2,498,730

UNITED STATES PATENT OFFICE 2,498,730

THERMIONIC AMPLIFIER CIRCUIT

Herbert Paul Williams, London, England, assignor, by mesne assignments, to International Standard Electric Corporation, New York, N. Y., a corporation of Delaware Application July 7, 1945, Serial No. 603,641
In Great Britain June 27, 1944

Section 1, Public Law 690, August 8, 1946
Patent expires June 27, 1964

4 Claims. (Cl. 343—108)

The present invention relates to improvements in electric signal translating circuits, and particularly, though not exclusively, to those used in radio navigational systems.

In radio guidance systems employing overlapping field-strength patterns, it is found that when the aircraft is getting very near the point of landing, unless some counteracting means is provided in the receiver, the deflections of the indicator for very small departures from the specified path tend to increase and become so large that the indicator readings become difficult to follow. It has been the custom, therefore, to provide an arrangement which progressively desensitizes the indicator as the aircraft nears the runway.

In these systems it is also usual to provide the receiver circuit with automatic gain control in order to counteract the variations of the signal strength as the aircraft approaches the landing ground. These two different kinds of control have hitherto been provided entirely separately, and as a result the receiver circuit tends to become complicated, and a large number of valves have to be used.

The principal object of the present invention is to provide a simple signal translating circuit having the special property that the comparative signal output range of fluctuations decreases as the input amplitude increases, and vice versa, at least over a certain range of input amplitudes. When such a circuit is employed in a radio glide path receiver, the sensitivity of the indications can be made to decrease in the desired manner as the aircraft approaches. The arrangement combines the sensitivity control with the usual automatic gain control, so that a considerably simplified circuit results, and several valves may be saved. The arrangement of the invention, is not, however, necessarily limited to navigational systems.

The invention accordingly provides an electric signal translating arrangement comprising an amplifier, means for applying signal waves to the input of the said amplifier, means for deriving translated signal waves from the amplifier, means for deriving from the output of the amplifier a control voltage whose magnitude varies in accordance with the signal variations of the input waves, and means for applying the said control voltage to control the gain of the amplifier in such a manner that the levels of the input and translated signal waves vary in opposite directions over the whole or part of the range of variation of the input level.

The invention also provides a radio receiver for a course indicating system for a moving vehicle comprising means for receiving signal modulated radio waves and for deriving therefrom corresponding signal modulated intermediate frequency waves, means for amplifying and rectifying the said intermediate frequency waves for the purpose of recovering therefrom the modulating signals, means for applying the recovered signals to operate a device for indicating departures from the prescribed course, and means for applying the recovered signals also to control the gain of the amplifying means in such manner that the sensitivity of the indications of the said device decreases as the field strength of the received radio waves increases and vice-versa.

The invention will be explained with reference to the accompanying drawing, in which Fig. 1 shows a schematic circuit diagram of a radio receiver for a glide path indicating system incorporating a translating arrangement according to the invention, Fig. 3 shows a minor modification of Fig. 1, and Fig. 2 shows automatic gain control characteristics used to explain the action of Figs. 1 and 3.

The invention will be illustrated as applied to a particular well known type of radio glide path indicating system for aircraft. In this system a transmitter on the ground is connected alternately to two aerial systems so that two overlapping radio field strength patterns are produced. The radiating periods are unequal for the two aerial systems so that one radiates a series of dots each lasting for say one quarter of the keying period, and the other radiates a series of dashes of three quarters of the keying period. The two radiating periods are interlaced so that in the overlapping portion of the patterns a continuous signal is radiated. The keying of the aerials might take place at some comparatively low rate such as 10 per second. The numerical details are given for illustration and may be widely varied according to circumstances.

The aircraft carries a radio receiver which picks up and demodulates the radio waves. The prescribed path is defined by the overlapping area of the field strength patterns. If the aircraft is within this area a continuous signal will be received. Outside this area characteristic dot or dash modulated signals will be received depending on the position of the aircraft relative to the prescribed path. The receiver includes means for discriminating between dots and dashes so that a visual indication of the position of the aircraft relative to the path can be provided.

The accompanying Fig. 1 shows a circuit diagram of a receiver of this kind which incorporates an example of a signal translating circuit according to the present invention. The waves modulated by the indicating signals in the manner explained are picked up by an antenna 1 and are amplified and translated in a series of stages represented by the block 2, which produces at its output an intermediate frequency wave also modulated by the indicating signals. The block 2 may be of any suitable type, which is immaterial as regards the present invention. The intermediate frequency waves are applied to the control grid of an amplifying pentode valve 3 coupled to the control grid of a second amplifying valve 4 through a transformer 5, the windings of which are preferably self-tuned to the intermediate frequency. Alternatively, appropriate tuning condensers (not shown) may be shunted across the windings. The amplifying valve 4 is coupled to a rectifying diode 6 through a second tuned transformer 7 similar to 5. The demodulated indicating signals are obtained in the load resistance 8 connected to the anode of the diode 6, this resistance being shunted by a condenser 9 of suitable capacity to by-pass the intermediate frequency.

The signal potential across the resistance 8 will consist of direct currents having amplitude variations at the keyed frequency assuming that the aircraft is off the course. These signals are applied through a blocking condenser 10 to a low pass filter 11 adapted to pass the keying frequency and sufficient of its harmonics to ensure a satisfactory wave form.

The keying frequency $f$ is passed to a discriminator 12 designed to produce a deflection on the indicating instrument 13 in one direction or the other according as dots and dashes are being received. This discriminator may be of any suitable type, such for example, a circuit able to distinguish an electric dot signal wave and its complimentary dash signal wave having two parallel circuit paths each including a rectifier, a condenser and a shunt resistance. Thus if the frequency $f$ is 10 cycles per second, a suitable cut-off frequency for the filter would be about 100 cycles per second.

Anode current for the valves 3 and 4 is supplied from the positive terminal 14 of the high tension supply through the primary windings of the corresponding transformers 5 and 7. The screen grids of these valves are polarized through appropriate resistances 15 and 16, with corresponding by-pass condensers 17 and 18. The cathodes are biassed by appropriate series resistances 19 and 20 shunted by the usual condensers 21 and 22. The cathode heating arrangements for the valves 3 and 4 and for the diode 6 are not shown, and may be supplied in any suitable way.

It has already been mentioned that it is necessary to provide automatic gain control for the receiver and also sensitivity control for the indicator 13. Hitherto separate arrangements have been supplied to carry out these two functions. According to the present invention both these controls are obtained by connecting the anode of the diode 6 to the suppressor grid of the valve 3 through a resistance 23, the suppressor grid being connected to the cathode through a condenser 24. The resistance R of the element 23 and the capacity C of the element 24 should be so chosen that the time constant RC is small compared with the period $1/f$, but large compared with the period of the intermediate frequency wave. This permits an alternating voltage at the frequency $f$ to be fed back to the suppressor grid together with a unidirectional voltage depending on the strength of the received waves, which voltage corresponds to the usual automatic gain control voltage.

The curve 25 of the accompanying Fig. 2 has been drawn to explain the action of the circuit of Fig. 1. The abscissae represent the values of the input alternating voltage at the intermediate frequency applied to the control grid of valve 3 on a logarithmic scale, and the ordinates represent the corresponding rectified direct currents in the load resistance 8 on an evenly divided scale.

During the approach the strength of the signals applied to the intermediate frequency amplifier will increase steadily, and superimposed on them will be fluctuations of input voltage which will depend on the amount of departure of the aircraft from the required course.

Let it be assumed that the aircraft accurately follows a course making a constant small angle with the prescribed course, then the percentage depth of modulation due to the keying will remain constant. Suppose the aircraft is at a point such that the input alternating voltage varies between 1.0 and 2.0 millivolts as represented by the ordinates 26 and 27 in Fig. 2. Then since the resistance 23 and condenser 24 have been so chosen that the frequency $f$ is applied to the suppressor grid of the valve 3 to control the gain, the rectified current in the resistance 8 will fluctuate between the corresponding abscissae 28 and 29. Thus there will be a variation of the rectified current equal to the distance between these two abscissae, which variation is about ±25 micro-amperes on the scale of ordinates. This therefore represents the output at the frequency $f$.

When the aircraft moves nearer the landing point, so that, for example, the input voltage varies between 100 and 200 milli-volts (the depth of molulation being supposed to be unaltered, as already explained) the horizontal distance between the corresponding ordinates 30 and 31 is the same, but the vertical distance between the corresponding abscissae 32 and 33 is now much less, owing to the flattening out of the curve 25, the output being now proportional to about ±10 micro-amperes only. It will thus be seen that as the aircraft approaches the landing point, the comparative range of fluctuations of the rectifier 6 at the keying frequency decreases, the depth of modulation being assumed to be constant. It can be seen that the amplification of the arrangement is substantially proportional to the slope of the automatic gain control characteristic near the region of operation, and this slope decreases as the aircraft nears the landing point. Hence the deflection sensitivity of the indicator 13 will progressively decrease, which is the action desired.

It is to be noted that with the usual automatic gain control arrangement, the resistance 23 and/or the capacity of condenser 24 are chosen to be much larger so that the changes due to keying are not passed on to the suppressor grid of the valve 3. This case may be illustrated from Fig. 2 by supposing that the scale of ordinates now represents the control voltage applied to the suppressor grid of valve 3, and the scale of abscissae represents the peak value of alternating input voltage at the intermediate frequency to which this control voltage is due. Thus if, for example, the peak input voltage is 1.0 millivolts, the amplification is substantially proportional to 230, while if the input voltage is 100 milli-volts, the amplification is proportional to about 420. In other words, the output at the keying frequency $f$ will increase both as the aircraft approaches the runway and as the depth of modulation increases, though at a slower rate than if there were no automatic gain control. This is just opposite to the action desired, and is the reason why in the earlier arrangements an additional desensitizing arrangement had to be incorporated in the circuit.

Referring again to Fig. 1, suitable values for the resistance 23 and for the capacity of the condenser 24 might be, for example, ½ megohm and 0.001 microfarad respectively, giving a time constant of 0.0005 second, which is small compared with the period of the keying frequency wave.

It will be evident to those skilled in the art that the circuit could be modified by applying the gain control voltage to the control grid (or other grid) of the valve 3 instead of to the suppressor grid as shown, and this control voltage, or a fraction of it, could be applied also, or instead, to a grid in the valve 4.

In the arrangement of Fig. 1, there is no provision for delaying the operation of the automatic gain control, that is, for suspending its operation until the input voltage has reached a certain minimum amplitude. If this is required, the arrangement shown in Fig. 3 may be adopted. Fig. 3 shows a modification of that part of Fig. 1 between the dotted lines 34 and 35, the circuit being otherwise unaltered except that the condenser 24 is omitted.

Referring to Fig. 3, the diode 6 is replaced by a double diode 36 having two separate cathodes. The amplified keyed waves from the secondary winding of the transformer 7 (Fig. 1) are applied over the conductor 37 to the cathode of the left-hand half of the double diode through a blocking condenser 38 and also directly to the anode of the right-hand half. The anode of the left-hand half is connected to ground through a resistance 39 shunted by a condenser 40, and also directly over conductor 41 to the suppressor grid of the valve 3 in Fig. 1, the condenser 24 being omitted, as already stated. The time constant of the combination of the resistance 39 and condenser 40 should be small compared with the period $1/f$ of the keyed frequency wave; for example, the resistance 39 could be ¼ megohm and the capacity of the condenser 40 could be 0.0001 microfarad. The cathode of the left-hand half of the double diode 36 is biassed positively from the high tension source by means of the potentiometer of resistances 42 and 43 which should be so chosen that the diode does not conduct until the input alternating voltage reaches a desired value. The resistance 42 is shunted by a condenser 44 for by-passing the intermediate frequency. The cathode of the right-hand half of the diode 36 is connected to earth through the load resistance 8 and condenser 9 is in Fig. 1, and the rectified output is applied through the condenser 10 to the filter 11 as before.

It will thus be seen that the rectified signal output and the gain control voltage are in this case separately derived to permit the introduction of the delaying bias for the control voltage.

The gain control characteristic for the arrangement of Fig. 3 is of the type shown by the curve 45 in Fig. 2. This has a lower steep portion 46 which represents the action before the automatic gain control begins to operate, and an upper flatter portion joining the portion 46 at a knee 47. The position of the knee 47 can be adjusted by suitably choosing the bias of the cathode of the left-hand half of the diode 36, and the slope of the upper portion can be changed by the introduction of suitable attenuating or amplifying means (not shown) in the conductor 41.

It will be evident to those skilled in the art, that the double diode 36 could be replaced by two separate diodes, and further that any of the diodes in Fig. 1 or 3 could be replaced by some other type of rectifier such as a dry rectifier, if preferred.

The invention is, of course, not restricted in any way by the numerical values suggested for illustration, and the curves shown in Fig. 2 are given as typical and do not necessarily represent in detail any particular case.

Although for the glide path system the modulating signal comprises a low keying frequency wave, in other applications of the invention the modulating signal could be of a more general character such as a speech signal. In such a case, the circuit connecting the diode 6 or 36 to the suppressor grid of valve 3 should have a time constant which is short compared with the period of the highest frequency signal component of interest. This connecting circuit could if desired be a low pass or band-pass wave filter adapted to transmit the signal frequencies, but to exclude the carrier waves, instead of the simpler condenser-resistance circuit, which may not be suitable in all cases.

It will be seen that the invention comprises a signal translating circuit provided with a gain control arrangement which produces a decrease in the comparative range of signal output variations when the amplitude of the input signal waves increases over a certain range, and vice-versa, and it therefore differs considerably from the usual automatic gain control arrangements which merely reduce or compress the amplitude variations of the input signal without inverting the sense of the variation. The application of the arrangement is not necessarily confined to radio navigational systems but may be employed more widely in arrangements where this type of inverted compression is required.

In the claims which follow, the term "level" used in connection with the waves signifies the average energy content of the wave concerned integrated over a period relatively long compared with the periods of the voltage or current or the like variations which constitute the signal, and which are called the "signal variations."

What is claimed is:

1. An arrangement for translating an electric signal having a recurrence frequency $f$ comprising an amplifier, means for applying signal waves to the input of the said amplifier, means for deriving translated signal waves from the amplifier including means to convert the signal to an intermediate frequency, means for deriving from the output of the amplifier a control voltage whose magnitude varies in accordance with the signal variations of the input waves, and means for applying the said control voltage to control the gain of the amplifier in such a manner that the range of variation of the input and translated signal waves vary in opposite directions over the whole or part of the range of variation of the input level including a time constant small compared to $1/f$ and large compared to the period of the intermediate frequency.

2. A radio receiver for a course indicating system for a moving vehicle comprising means for receiving signal modulated radio waves having a recurrence frequency $f$ and for deriving therefrom corresponding signal modulated intermediate frequency waves, means for amplifying and rectifying the said intermediate frequency waves for the purpose of recovering therefrom the modulating signals, means for applying the recovered signals to operate a device for indicating departures from the prescribed course, and means for applying the recovered signals also to control the gain of the amplifying means in such manner that the sensitivity of the indications of the said device decreases as the field strength of the received radio waves increases and viceversa including a time constant small compared to $1/f$ and large compared to the period of the intermediate frequency.

3. A radio receiver according to claim 2 in which the means for recovering the signals comprises a second rectifier connected to the output of the amplifier, and a circuit connecting the said second rectifier to a gain control electrode of a thermionic valve in the said amplifier, the said circuit being adapted to transmit the modulating signal waves and to suppress the carrier waves.

4. A radio receiver for a glide path indicating system for a landing aircraft comprising means for receiving signal modulated radio waves and for deriving therefrom corresponding signal modulated intermediate frequency waves, a demodulator including rectifying means and a circuit connecting said rectifying means and said intermediate frequency means having a time constant large compared with the period of the carrier wave, but small compared with the period of the highest frequency component of the modulating signal wave for recovering the modulating signal from the said intermediate frequency waves, and means for applying the recovered signals to operate a device for indicating departures from the prescribed glide path.

HERBERT PAUL WILLIAMS.

REFERENCES CITED

The following references are of record in the file of this patent:

UNITED STATES PATENTS

| Number | Name | Date |
|---|---|---|
| Re. 22,484 | Cooke et al. | May 23, 1944 |
| 2,051,966 | Runge | Aug. 25, 1936 |
| 2,058,565 | Case | Oct. 27, 1936 |
| 2,171,657 | Klotz | Sept. 5, 1939 |
| 2,286,804 | Hoover | June 16, 1942 |
| 2,327,641 | Hoover | Aug. 24, 1943 |
| 2,393,624 | Ferrill | Jan. 29, 1946 |
| 2,419,970 | Roe | May 6, 1947 |
| 2,423,337 | Moseley | July 1, 1947 |
| 2,439,044 | Ferrill | Apr. 6, 1948 |

OTHER REFERENCES

Ser. No. 274,145, Kramar (A. P. C.), published May 25, 1943.